(12) United States Patent
Grambichler et al.

(10) Patent No.: US 9,677,911 B2
(45) Date of Patent: Jun. 13, 2017

(54) MAGNETIC FIELD SENSOR AND METHOD OF OPERATION THEREOF WITH A DETERMINATION OF OFFSET VALUES SELECTABLE DURING OPERATION OF THE SENSOR

(71) Applicant: Infineon Technologies AG, Neubiberg (DE)

(72) Inventors: Klaus Grambichler, Villach (AT); Simon Hainz, Klagenfurt (AT)

(73) Assignee: Infineon Technologies AG, Neubiberg (DE)

( * ) Notice: Subject to any disclaimer, the term of this patent is extended or adjusted under 35 U.S.C. 154(b) by 164 days.

(21) Appl. No.: 14/607,389

(22) Filed: Jan. 28, 2015

(65) Prior Publication Data

US 2015/0211889 A1    Jul. 30, 2015

Related U.S. Application Data

(60) Provisional application No. 61/933,832, filed on Jan. 30, 2014.

(51) Int. Cl.
*G01B 7/30* (2006.01)
*G01D 5/12* (2006.01)
*B60Q 11/00* (2006.01)
*G01D 5/244* (2006.01)

(52) U.S. Cl.
CPC ............ *G01D 5/12* (2013.01); *B60Q 11/00* (2013.01); *G01D 5/2449* (2013.01); *G01D 5/24452* (2013.01)

(58) Field of Classification Search
CPC ...................................................... G01B 7/30
USPC ...................................................... 324/207.25
See application file for complete search history.

(56) References Cited

U.S. PATENT DOCUMENTS

| 2010/0013467 | A1 | 1/2010 | Hara et al. | |
|---|---|---|---|---|
| 2011/0298449 | A1* | 12/2011 | Foletto et al. | 324/207.13 |
| 2013/0335067 | A1 | 12/2013 | Dwyer et al. | |

FOREIGN PATENT DOCUMENTS

| DE | 19819783 | 11/1999 |
|---|---|---|
| DE | 10228744 | 1/2003 |

* cited by examiner

*Primary Examiner* — Bot Ledynh
(74) *Attorney, Agent, or Firm* — Schiff Hardin LLP

(57) ABSTRACT

At least one embodiment relates to magnetic field sensors being operable at different calibration modes, wherein the magnetic sensor is capable of switching between the different calibration modes during normal operation of the sensor. The switching may be possible in response to different motion types detected within the sensor. Such sensors may be used in vehicles such as cars, the sensors for example being part of the engine control system or the ABS. Another embodiment relates to a method of changing calibration modes during operation of sensors.

21 Claims, 3 Drawing Sheets

Transmitter wheel

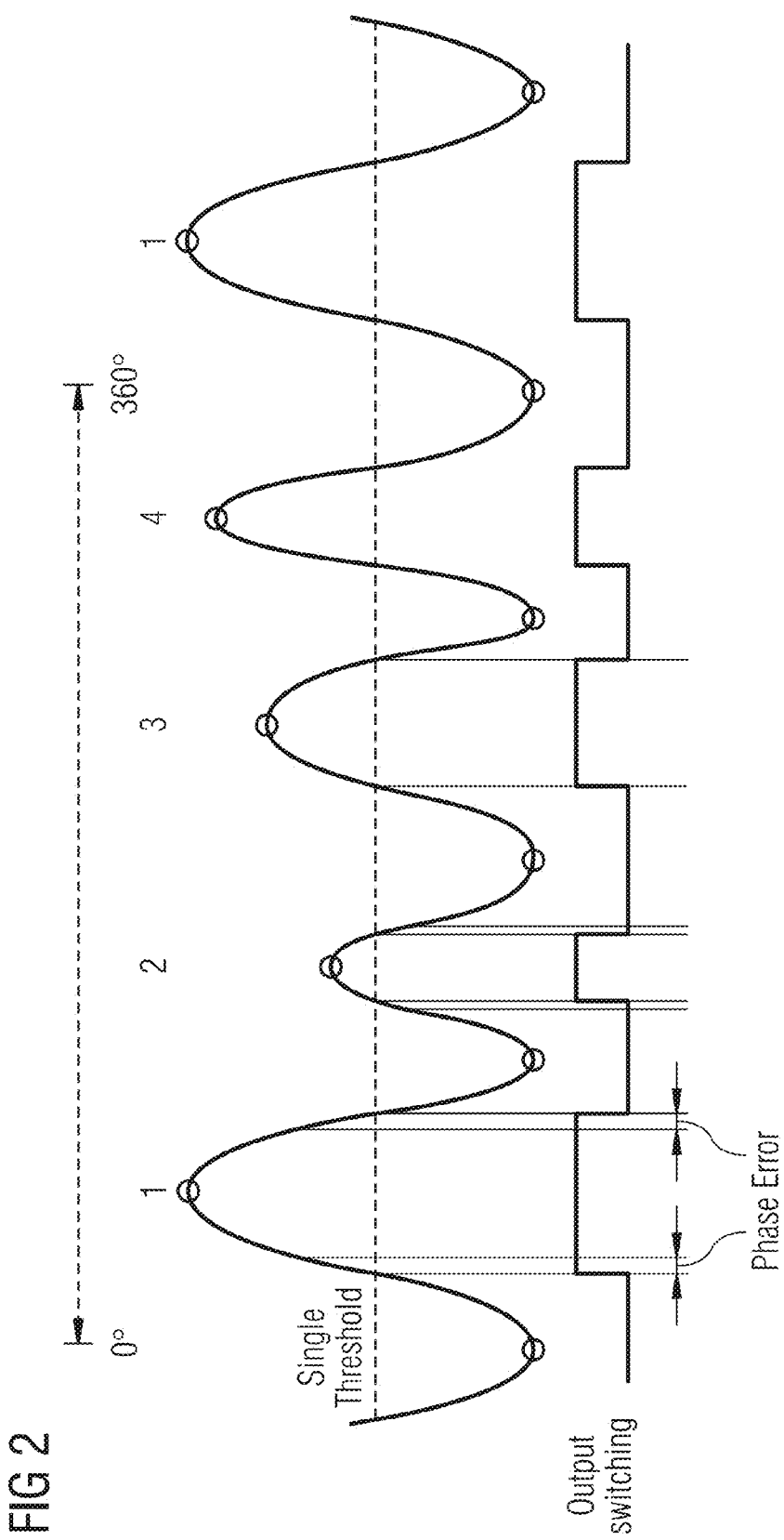

MAGNETIC FIELD SENSOR AND METHOD OF OPERATION THEREOF WITH A DETERMINATION OF OFFSET VALUES SELECTABLE DURING OPERATION OF THE SENSOR

BACKGROUND

The present invention relates to magnetic field sensors being operable at different calibration modes, wherein the magnetic sensor is capable of switching between the different calibration modes during normal operation of the sensor. The switching may be possible in response to different motion types detected within the sensor. In modern automotive products such as for example cars, magnetic sensors are used in various places of such a car. An example of such magnetic field sensor is the use of the magnetic field sensor in combination with a crankshaft of an engine, so that a rotational movement and/or position of the crankshaft may be derivable from an output signal generated by the magnetic field sensor.

In modern vehicles there is a tendency to reduce and/or simplify electronic components, such as for example an engine control system. Therefore a magnetic field sensor used to determine a current state of the crankshaft needs to implement more and more sophisticated algorithms in order to provide sufficient accuracy of the determined rotational position of the crankshaft.

In order to achieve this, such magnetic field sensors are already powered up, once one or more doors of a vehicle are being opened. This is helpful to achieve an operational state of the sensor even before starting the engine.

For similar reasons it is not uncommon in the art to power up magnetic field sensors pertaining to the ABS system and/or tyre pressure management system upon opening of doors of the vehicle.

As a trade-off the now operational, i.e. powered-up sensors may become sensitive to movements of the vehicle not caused by the engine, i.e. within the drive train, but for example by loading or offloading goods to/from the vehicle. As an unwanted consequence an engine management warning may be triggered albeit the engine as such did not move whatsoever and is in perfect condition to be started. Such a safety warning may be distressing for the driver and unwanted for the manufacturer of the vehicle, alike.

It is therefore an aim of the present invention to provide a magnetic field sensor and a vehicle overcoming the problems of the prior art. The invention further discloses a method of operating such sensor.

BRIEF DESCRIPTION OF THE SEVERAL VIEWS OF THE DRAWINGS

The invention shall in the following be explained based on the accompanying drawings, wherein

FIG. 2 shows a typical output signal of a magnetic field sensor.

DETAILED DESCRIPTION

Figure 1A:
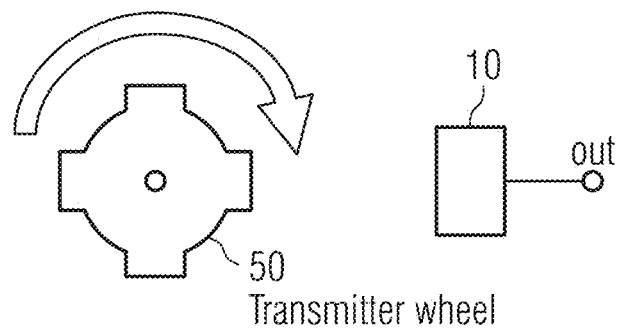
FIG. 1A shows a first embodiment of a transmitter wheel in combination with a magnetic field sensor.

The following detailed description explains exemplary embodiments of the present invention. The description is not to be taken in a limiting sense, but is made only for the purpose of illustrating the general principles of embodiments of the invention while the scope of protection is only determined by the appended claims.

In the exemplary embodiments shown in the drawings and described below, any direct connection or coupling between functional blocks, devices, components or other physical or functional units shown in the drawings or described herein can also be implemented by an indirect connection or coupling. Functional blocks may be implemented in hardware, firmware, software, or a combination thereof.

Further, it is to be understood that the features of the various exemplary embodiments described herein may be combined with each other, unless specifically noted otherwise.

In the various figures, identical or similar entities, modules, devices etc. may have assigned the same reference number. Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

In the described embodiments, various specific views or schematic views of elements, devices, features, etc. are shown and described for a better understanding of embodiments. It is to be understood that such views may not be drawn to scale. Furthermore, such embodiments may not show all features, elements etc. contained in one or more figures with a same scale, i.e. some features, elements etc. may be shown oversized such that in a same figure some features, elements, etc. are shown with an increased or decreased scale compared to other features, elements etc.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

FIG. 1a schematically depicts a magnetic field sensor 10 or magnetic sensor 10. The magnetic sensor 10 is operable with a rotatable transmitter wheel 50, for example in a rotational direction as indicated by the arrow. The transmitter wheel 50 is shown with four sprockets or teeth carrying little magnets (not shown) in order to convey a pattern of alternating magnetic fields to the magnetic sensor upon rotation of the transmitter wheel 50. Without limitation the transmitter wheel 50 may comprise more than four teeth. With increasing accuracy requirements for the determination of a rotational position of an axis relative to the sensor 10, one may increase the number of teeth arranged on the transmitter wheel 50. The magnetic sensor 10 is in a state operable with the transmitter wheel 50, as long as it is provided that the magnetic sensor 10 is able to detect the pattern of alternating magnetic fields. Typically in technical applications in the automotive field there is an air gap of a few millimeters between the transmitter wheel 50 and the magnetic sensor 10.

Figure 1B:
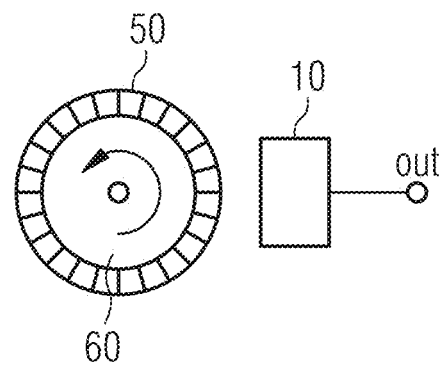
FIG. 1B shows a second embodiment of a transmitter wheel in combination with a magnetic field sensor.

FIG. 1B depicts a second embodiment of a transmitter wheel 50 mounted on a rotating shaft 60, such as an axle portion around which a wheel of a car is rotating. Such an embodiment of the transmitter wheel 50 may be used for example in combination with an ABS system and the like. A person skilled in the art will readily appreciate other scenarios in which such a transmitter wheel 50 may be useful in combination with the magnetic sensor 10.

FIG. 2 depicts a sinusoidal input signal received from the transmitter wheel 50. The amplitude of such the input signal may be irregular in amplitude due to irregularities of the transmitter wheel 50 and/or its arrangement relative to the rotating axis. For ease of explanation each minimum and subsequent maximum within the input signal are labelled with a number of a tooth of the transmitter wheel 50 causing this portion of the input signal. The output signal provided by the magnetic sensor 10 is an output switching signal as indicated below the sinusoidal curve in FIG. 2. It is common in the art to use a threshold or offset, when evaluating the input signal of the sensor 10 in order for the output signal to securely reflect the movement of the transmitter wheel 50. This may lead to a phase error within the output switching.

Such methods as explained in FIG. 2 are of particular interest in situations with the transmitter wheel spinning or evolving around the shaft. This is a state of a crankshaft once the engine is running. Likewise this is the normal condition of an individual wheel of such a vehicle comprising an ABS system. It is also known in the art to derive a direction of motion of the transmitter wheel 50, i.e. directional information from the sensor input signal. The directional information may be useful in order to overcome the problems of the prior art mentioned before.

Figure 3:
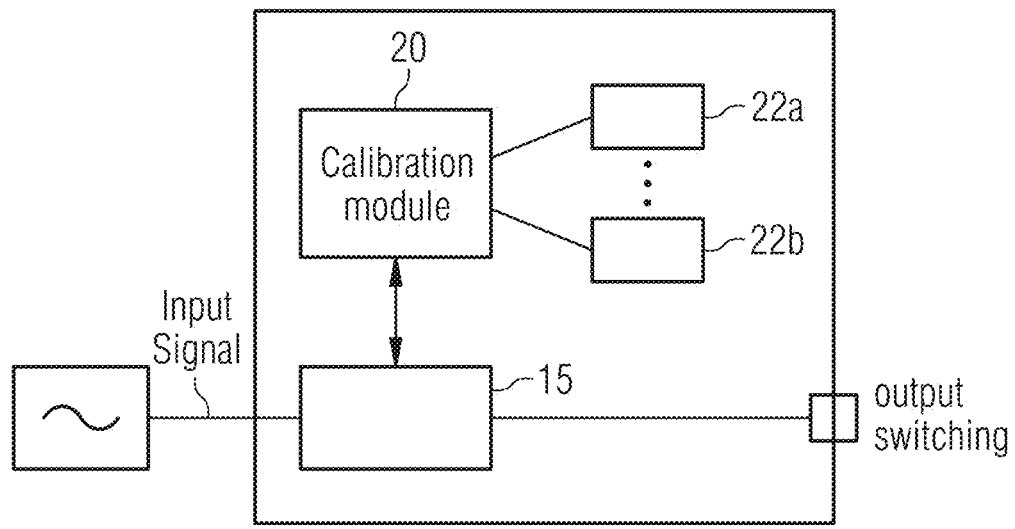
FIG. 3 shows a block diagram of a magnetic field sensor according to a first embodiment of the invention.

FIG. 3 schematically depicts a block diagram of a magnetic sensor 10 according to an embodiment of the present invention. The magnetic sensor 10 comprises a direction module 15. The direction module 15 is adapted to derive the directional information from the input signal of the magnetic sensor 10. According to an embodiment of the invention the magnetic sensor 10 further comprises a calibration module 20. The calibration module 20 may be configured to calibrate an offset, as explained above, when the sensor 10 is in operation with the transmitter wheel 50. According to an embodiment the calibration module may be adapted to select a specific calibration mode 22a, 22b out of a plurality of calibration modes.

According to an embodiment of the invention the calibration module may be selected, i.e. amended during operation of the sensor 10. Such a possibility has the advantage to provide dedicated calibration modes 22a, . . . , 22b according to different states of the engine, and/or the vehicle.

Such different calibration modes 22a, . . . , 22b may be of interest should the magnetic sensor 10 be powered-up before the actual start of the engine, as is the case in modern cars. So suppose the vehicle is being loaded/unloaded. The loading activities may cause movement to the car which projects to the crankshaft of the engine. Under normal operational conditions the rotation of the crankshaft may be a rotation in a given direction, clockwise or anticlockwise.

Different the rotational movement in a given direction, the movement projecting to the crankshaft while the engine is switched off, mostly resembles a gentle or shallow rocking movement of the crankshaft. The rocking movement is not in a fixed direction but changes direction from clockwise to anticlockwise or vice versa.

When calculating an offset for the magnetic sensor 10 for normal operational conditions of the engine, one may average over all teeth of the transmitter wheel 50 as indicated in FIG. 2. However such a calibration mode would require one or more full revolutions of the crankshaft in order to correctly represent the movement of the crankshaft in the output switching of the magnetic sensor 10. With increasing requirements on reaching reliable switching signals from the sensor 10 such a calibration mode may take too long to reach a reliable offset value. Hence one may refer to such a calibration mode as a "slow" calibration mode. In the slow calibration mode 22, one does typically not make use of the directional information contained within the input signals of the sensor 10.

In order to improve accuracy of the offset values more quickly, there is an interest to devise a calibration mode yielding a reliable offset faster. Therefore one could consider a sensor input signal pertaining to only one or a smaller number of teeth of the transmitter wheel 50 and extract a first offset from this input signal. The tradeoff of such a "fast" calibration mode being that the first offset value may not yet be a perfect match for all teeth of the transmitter wheel 50.

Both "slow" and "fast" calibration modes are still susceptible to false switching output when confronted with the rocking movement projecting to the crank shaft or the axle of the ABS system, while the vehicle is being loaded/unloaded in a parked position.

In order to overcome this problem it is suggested to select a calibration mode 22a, 22b during operation of the magnetic sensor 10. In particular one may use a detected motion type of the transmitter wheel 50 in order to choose an appropriate calibration mode 22a, 22b leading to an offset value no longer susceptible to false interpretation of the rocking motion.

The motion type detectable at the detection module 15 may comprise a rotational movement of the transmitter wheel 50 in the clockwise or the anticlockwise direction. A further motion type is the above mentioned rocking motion, typically not reaching a full revolution of the crankshaft or the axle monitored by the ABS system and further changing its rotational direction.

Using the directional information from the direction module 15 will improve the sensor switching output. A decision which of the calibration modes 22a, 22b to use, based on the directional information prevents the sensor 10 from not recognizing the rocking motion and in extreme cases causing a system warning to the driver, due to movement even before starting the engine.

It is to be noted even though the calibration module 20 in FIG. 3 is only shown as linked to the input signal via the direction module 15, there may be a direct link from the calibration module 20 to the input signal without departing from the present invention.

So according to an embodiment of the present invention, a first calibration mode 22a usable in combination with a rocking motion may be the "fast" calibration mode described above. It is of interest to choose the first calibration mode 22a based on a detection of a rocking motion by the direction module 15. The first calibration mode 22a may for example use a signal from a first tooth of the transmitter wheel passing the sensor 10.

Without limitation the first calibration mode 22a may use an (input) signal pertaining to a plurality of teeth, for example 2-5 of the transmitter wheel 50. It is of interest not to use a signal pertaining to a full revolution of the transmitter wheel 50, as such a (slow) calibration scheme may under some circumstances take too long to reach a reliable value. Such circumstances could be for example during the first few seconds after starting the engine.

Further the first calibration mode 22a may not correctly represent the rocking movement. It may therefore be of interest to consider a number of teeth lower than half, a quarter or an eighth of the total number of teeth in the transmitter wheel 50. A person skilled in the art will readily appreciate, that an appropriate portion of all teeth to be considered is directly linked to the total number of teeth in a given transmitter wheel.

When there is no rocking movement, it may instead be of interest to use a variant of the "slow" calibration as a form of the second calibration mode 22b, taking into account a signal pertaining to a larger number of teeth, in particular one or more full revolutions of the transmitter wheel 50 when calibrating the offset. Likewise the second calibration mode 22b may be of interest after the engine is started for a few seconds. Again a number of teeth to be considered obviously depends on the total number of teeth within the transmitter wheel 50 used.

It will be appreciated that considering the directional information from the direction module 15 will allow switching from the first calibration mode 22a to the second calibration mode 22b once the rocking movement is no longer present. This will provide greater reliability in achieving appropriate offset factors adapted to different conditions of the vehicle, including a parked vehicle exposed to rocking movement.

It will be appreciated that according to an embodiment this disclosure teaches a vehicle comprising the inventive sensors according to one or several of the embodiments explained before. The vehicle may be in particular a car. The transmitter wheel 50 may be for example coupled to an axle portion. Thereby the magnetic sensor 10 could form part of an ABS system of the vehicle, and a movement of the transmitter wheel 50 would reflect rotation of a wheel of the vehicle rotating around the axle portion.

For the vehicle according to an embodiment of the invention, the magnetic sensor 10 may be operable before start of the engine. Further the magnetic sensor 10 may alternatively or additionally operable upon opening of at least one door of the vehicle.

Figure 4:
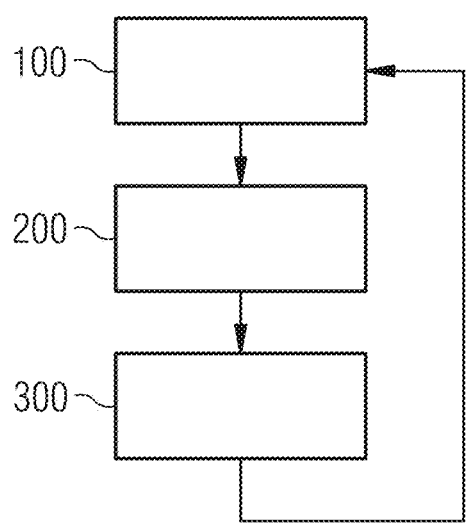
FIG. 4 shows a diagram displaying a method according to the invention.

The present invention according to a further aspect discloses a method of calibrating a magnetic sensor 10. The method is schematically shown in FIG. 4.

In a step 100 a motion type is detected. This may happen using the direction module 15 and for a transmitter wheel 50, as explained above. In a further step 200 a calibration mode is being selected during operation of the magnetic sensor 10. It is to be understood that the method according to the present invention therefore allows more flexibility in choosing an adapted calibration mode than the prior art. It is of interest to select the calibration mode 22a, 22b according to the detected motion type of the transmitter wheel 50 as explained before.

The method may further comprise a step of calibrating 300 the offset of the magnetic field sensor 10 according to the selected calibration mode. Therefore the achieved offset parameters are more reliable in different conditions of the vehicle, in particular for the parked vehicle being exposed to the rocking movement.

It will be appreciated by a person of ordinary skill in the art that the present invention also allows for changing a previously selected calibration mode by returning to step 100 after completion of step 300. Therefore the present invention provides more flexibility and reliability in calculating the offset for changing conditions for the vehicle as outlined above.

What is claimed is:

1. A magnetic sensor operable with a rotatable transmitter wheel, the magnetic sensor comprising:
    a direction detector adapted to detect a motion type of the transmitter wheel;
    a calibrator adapted to calibrate an offset of the magnetic sensor when in operation with the transmitter wheel; and
    the calibrator further being adapted to select, based on the detected motion type, at least a first calibration mode out of a plurality of calibration modes during operation of the magnetic sensor.

2. The magnetic sensor according to claim 1, wherein the motion type is a rocking motion of the transmitter wheel, or a rotational movement of the transmitter wheel in a given direction of rotation, over at least one cycle of the transmitter wheel.

3. The magnetic sensor according to claim 1, wherein the calibrator is adapted to select the first calibration mode for calibrating the offset, if a rocking motion was detected by the direction detector.

4. The magnetic sensor according to claim 2, wherein the calibrator is adapted to select a second calibration mode for calibrating the offset, if the rotational movement in a given direction is detected by the direction detector.

5. The magnetic sensor according to claim 1, wherein the first calibration mode uses a signal from a first tooth of the transmitter wheel passing the sensor for calibrating the offset.

6. The magnetic sensor according to claim 1, wherein the first calibration mode uses a signal from the first two to five teeth of the transmitter wheel passing the sensor for calibrating the offset.

7. The magnetic sensor according to claim 1, wherein the first calibration mode uses a signal in response to a first plurality of n teeth of the transmitter wheel passing the sensor for calibrating the offset; wherein n is lower than half a total number of teeth of the transmitter wheel.

8. The magnetic sensor according to claim 7, wherein n is lower than a quarter of the number of teeth of the transmitter wheel.

9. The magnetic sensor according to claim 1, wherein the second calibration mode uses a signal in response to m first teeth passing the sensor for calibrating the offset.

10. The magnetic sensor according to claim 9, wherein m equates to the total number of teeth of the transmitter wheel.

11. The magnetic sensor according to claim 1, wherein the calibrator is configured to switch from the first calibration mode to a second calibration mode, if a detected motion of the transmitter wheel changes from a rocking motion to the rotational movement of the transmitter wheel in a given direction.

12. A vehicle comprising the magnetic sensor according to claim 1.

13. The vehicle according to claim 12, wherein the transmitter wheel is linked to a crankshaft of an engine of the vehicle.

14. The vehicle according to claim 12, wherein the transmitter wheel is coupled to an axle portion such that movement of the transmitter wheel reflects motion of a wheel rotating around the axle portion.

15. The vehicle according to claim 12, wherein the magnetic sensor is operable before start of the engine.

16. The vehicle according to claim 10, wherein the magnetic sensor is operable upon opening of at least one door of the vehicle.

17. A method for calibrating an offset of a magnetic sensor, the method comprising:
- detecting a motion type of a transmitter wheel;
- selecting, based on the detected motion type, a calibration mode out of a plurality of calibration modes according to the detected motion type; and
- calibrating an offset of the magnetic field sensor according to the selected calibration mode.

18. The method according to claim 17, further comprising: switching from a first calibration mode to a second calibration mode during operation of the magnetic sensor.

19. The magnetic sensor according to claim 1, wherein the first calibration mode uses a signal from the first two to fifteen teeth of the transmitter wheel passing the sensor for calibrating the offset.

20. The magnetic sensor according to claim 9, wherein m equates to half the total number of teeth of the transmitter wheel.

21. The magnetic sensor according to claim 9, wherein m equates to more than the full number of teeth of the transmitter wheel.

\* \* \* \* \*